March 28, 1950  B. J. MERKLE  2,501,686
CONTACT TERMINAL FOR ELECTRIC MOTORS
Filed April 15, 1948

INVENTOR:
BERNARD J. MERKLE
BY
ATT'Y

Patented Mar. 28, 1950

2,501,686

UNITED STATES PATENT OFFICE 2,501,686

CONTACT TERMINAL FOR ELECTRIC MOTORS

Bernard J. Merkle, Chicago, Ill.

Application April 15, 1948, Serial No. 21,104

7 Claims. (Cl. 171—252)

1

This invention relates in general to an electric motor but is more particularly described in connection with the smaller sizes of electric motors commonly known as fractional horsepower motors.

In one of the types of electric motors to which this invention is applied, a winding is partially enclosed in an armature which also encloses the rotor of the motor. The ends of the magnet winding are brought to the outside where they are engaged and attached to the proper terminals for making electrical operating connections for the motor by which it may be tested and run in actual practice. If these terminal wires are left loose, or if they are not properly protected, they may break off close to the winding where it is very difficult to make a repair connection or a new terminal, thus making the motor inoperative and difficult to repair.

In testing small motors of this kind, it is customary to apply the terminals at opposite sides of the winding into a testing rack so that by simply inserting the motor and the winding terminals between fixed terminals on the rack, an electrical connection is made trough the winding for operating the motor without making it necessary to attach and disconnect a terminal connection by means of screws or other laborious fastening devices.

The present invention provides contact terminals located at the extremities of the winding in engagement with and extending over and protecting the ends of the magnet winding and in connection with a crosspiece which bridges the winding at that side for additionally protecting the winding and for providing screw terminal means by which an electrical connection is made to the motor entirely spaced from the more delicate wire terminals of the winding.

An important object of the invention is to provide contact terminals for electric motors which not only protect the terminal wires of a winding, but do not change the location of these terminals so that the same racks may be used for testing the motors.

A further object of the invention is to provide contact terminals which are mounted at the outer side of an insulated crosspiece where they are more accessible for the attachment of conductors thereto.

Still a further object of the invention is to provide fastening means for the connection of conductor wires to the conductor terminals in which the fastening screws are prevented from complete disengagement with the supporting means

2 so that the attaching means for a conductor does not become lost.

Other objects of the invention will appear in the specification and will be apparent from the accompanying drawings in which Fig. 1 is a perspective view of a small motor having the contact terminals of the present invention applied thereto;

Figure 1:
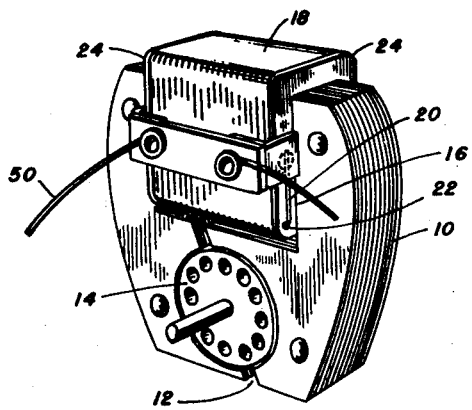
Figure 2:
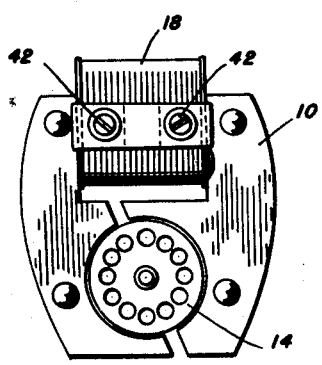
Fig. 2 is a side elevation of the motor shown in Fig. 1.
Figure 3:
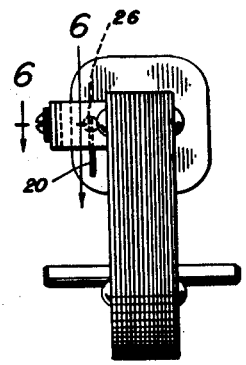
Fig. 3 is an edge view of the motor shown in Fig. 1.
Figure 4:
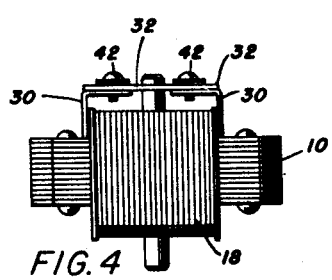
Fig. 4 is a top view of the motor shown in Fig. 1.

In the smaller sizes of electric motors, the protection of the wiring and the terminal connections are very important for the reason that the wire sizes are usually very small, a few bends of the terminal extremities are frequently sufficient to break them and if the wires are broken off short, close to the winding itself, it is difficult to make a new terminal connection without a special repair job. By providing contact terminals which engage and protect the terminal wires of a winding, there is no interference with the testing of the motor in the ordinary manner and the magnet wire terminals as well as the magnet itself are additionally protected upon one side of the winding, the side which requires the most protection.

Referring now more particularly to the drawing, a small electric motor of the fractional horsepower type is illustrated having an armature 10 made of laminations secured together with an opening 12 therein for receiving a rotor 14 and with a slot 16 for receiving a magnet winding 18.

Each magnet winding consists of a large number of turns of small wire having extremities 20 which are brought out through small holes 22 in insulating end pieces 24 of fiber or similar material. These wire extremities 20 are frequently attached by a drop or portion of solder 26 attached to the end piece 24 to secure and accentuate the contact of the wire extremity and to this terminal conductor wires for operating the motor have been attached in various ways. By providing the solder terminals at the sides of the magnet winding, it has provided a convenient means for inserting a small motor of this kind in a testing rack with the terminals in proper electrical engagement with terminals of the racks.

To this construction is applied a pair of angular contact terminals 30 of any suitable conductor metal, each terminal being separately connected at one extremity of an insulating crosspiece 32 of fiber or any other suitable insulating material.

Figures 6, 7:
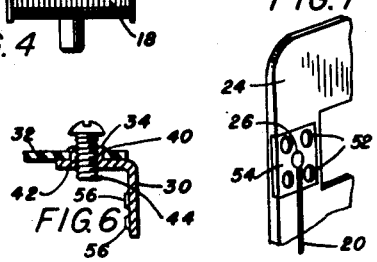
Fig. 6 is a sectional detail taken on the line 6—6 of Fig. 3.
Fig. 7 is a perspective view of a portion of one of the winding end discs.

The method of attaching each terminal to the crosspiece is more clearly shown in Fig. 6 in which a hollow rivet 34 is punched out of the material of one angular portion of the terminal and inserted through an opening 36 at one end of the crosspiece. The inside of this rivet is provided with fastening threads 38 and the outer edge 40 of the rivet is expanded over the opposite edge of the crosspiece to hold the contact terminal 30 tightly in place and at an angle projecting slightly beyond the extremity of the crosspiece, and to provide a direct electrical contact to the contact terminal 30.

Insertable through each threaded rivet is a fastening screw 42 of which one edge 44 is distorted after insertion through the threaded rivet so that the screw is not easily removed from the crosspiece and is not easily lost or displaced.

Surrounding each screw at the outside of the crosspiece are washers 46 between which a conductor wire 50 may be inserted to make necessary electrical connections for running the motor.

Figure 5:
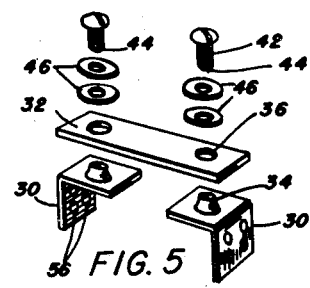
Fig. 5 is an expanded view showing the parts of a contact terminal in perspective.

A complete assembled contact terminal unit, the parts of which are shown in Fig. 5 is applied over the winding of a finished motor, the drop or portion of solder 26 which is normally applied to the end of the wire extremity being usually sufficient for securing the contact terminal unit in place, and the unit is not easily disengaged or broken therefrom because the terminals are secured in spaced relation to the crosspiece and are held tightly against the ends 24 of the winding by the solder portions thereon.

To additionally attach or secure the contact terminal in place, recesses or depressions 52 are provided in a conductor plate 54 molded or otherwise secured in the end piece 24 of the coil, the solder 26 at the end of the wire 20 being seated in a central depression or in one of the depressions leaving the other adjacent depressions free to engage one or more projections 56 embossed at the inner side of the corresponding contact terminal 30, as shown more clearly in Figs. 6 and 7. With this construction, the contact terminal unit may be applied over the end pieces 24 at the ends of the winding and the projections 56 or one or more of them at each end will engage or snap into resilient engagement with the recesses or depressions 52 in the plate 54.

With this construction, the motor may be tested in the same way by inserting the terminals 30 between the terminals of a testing block and the connection of these terminals is such that it protects the terminal wires and tends to prevent damaging engagement of the wire of the winding 18 at the terminal side of the motor where it is most subject to damage.

This contact terminal construction has been described in detail and it should be regarded as an illustration and example of the invention rather than a restriction or limitation thereof, as various changes in the construction, combination, and arrangement of the parts may be made without departing from the spirit and scope of the invention.

I claim:
1. The combination with a winding coil having spaced ends and interposed sides with wire terminals at opposite ends adjacent the same side of the coil and means forming an engageable terminal at each of the wire terminals and contact terminal means comprising an angular contact terminal member engageable with each of the wire terminals, and an insulating crosspiece connected to the angular terminal members spacing them apart so that they may be moved into resilient engagement with the wire terminals for holding the contact terminal means in place and protecting the coil at the adjacent side thereof.

2. A winding coil of substantially cylindrical shape having insulating end pieces with recesses at the outer sides, a wire from the coil having a terminal at each end seated in one of the recesses, and contact terminal means comprising an angular terminal member at each end, and an insulating connecting crosspiece for spacing the terminal members apart, the members adapted to be engaged over the wire terminals to hold them in place, and projections from the inner side of each angular terminal member one or more of which engages in the corresponding recess or recesses of the end pieces to hold the contact terminal means releasably in place.

3. A winding coil of substantially cylindrical shape having insulating end pieces with a conductor plate secured to the outer side of each end piece and with a plurality of recesses in the outer face of each conductor plate, the wire of the coil having terminal extremities, each seated in one of the recesses of the conductor plate at the corresponding end of the coil, and contact terminal means comprising an angular terminal member at each end having a plurality of projections at the inner side, and an insulating connecting crosspiece for engaging the angular terminal members and spacing them apart, the said angular terminal members being movable together by the cross piece into engagement with the wire terminals for holding them in the recesses of the conductor plate, and one or more of the projections from the inner side of each angular terminal member engaging in corresponding recesses of the conductor plate for holding the contact terminal means releasably in place, and conductor attaching means for each angular terminal member adjacent to the outer end of the crosspiece.

4. In an electric motor, the combination with an armature comprising a winding mounted thereon, the winding having spaced ends and interposed sides, of a conductor wire for the winding having extremities at opposite ends of the same side of the winding, and contact terminal means comprising an angular contact terminal member engaging each of the wire extremities, and an insulating cross piece connected to the angular terminals spacing them apart and protecting the winding coil at the side of the armature.

5. The combination with a motor armature, of a winding therefor having spaced ends and interposed sides with wire terminals at opposite ends of the same side of the winding and at one side of the armature, an angular contact terminal to engage the extremity of each wire, an insulating cross piece to engage one angular side of each terminal to space the cross piece outwardly from the winding and to hold the other angular portions of the terminal in tight engagement with the extremities of the wires, and conductor fastening means inserted through the cross piece and engaging each of the contact terminals separately for attaching conductors thereto.

6. The combination with a winding having spaced ends and interposed sides with terminal wires at opposite ends adjacent the same side of the winding, of an angular contact terminal for engaging each terminal wire and extending outwardly over the adjacent edge of the winding and having a hollow rivet punched outwardly from the extending portion of the angular terminal, an insulating cross piece having perforations through which the rivets extend and to which the outer ends of the rivets are applied for securing the cross piece to the angular terminals and holding the other angular portions of the angular terminals in close contact with the terminal wires, the rivets being threaded internally, and wire fastening screws insertable through the rivets for attaching conductors separately to the angular terminals.

7. The combination with a winding of substantially cylindrical shape having insulating end pieces, each having an outer attached conductor to which one extremity of the winding wire is electrically connected, an angular conductor terminal having one portion to engage each wire extremity and another portion to project outwardly from the winding and with a hollow threaded rivet punched outwardly from this portion of the terminal, an insulating cross piece with perforations to engage over the rivets and the outer ends of the rivets extending over the outside of the cross piece to hold the terminals tightly in engagement with the wire extremities, a conductor fastening screw inserted from the outside through each of the hollow rivets and the inner end of the screw being upset after insertion to prevent accidental removal of the screw.

BERNARD J. MERKLE.

No references cited.